United States Patent [19]

Ludecke et al.

[11] 4,264,344
[45] Apr. 28, 1981

[54] DIESEL ENGINE EXHAUST PARTICULATE TRAP

[75] Inventors: Otto A. Ludecke; Theodore L. Rosebrock, both of Rochester, Mich.

[73] Assignee: General Motors Corporation, Detroit, Mich.

[21] Appl. No.: 119,000

[22] Filed: Feb. 6, 1980

[51] Int. Cl.³ .................................. B01D 46/46
[52] U.S. Cl. ................................... 55/313; 55/314; 55/420; 55/478; 55/484; 55/487; 55/498; 55/DIG. 30; 60/311; 60/324
[58] Field of Search ............... 55/309, 312–314, 55/318, 350, 420, 478, 484, 487, 498, DIG. 30; 60/311, 324

[56] References Cited

U.S. PATENT DOCUMENTS

| | | | |
|---|---|---|---|
| 3,129,078 | 4/1964 | Hobbs | 55/313 |
| 3,494,114 | 2/1970 | Nelson et al. | 55/498 |
| 3,495,401 | 2/1970 | Lenane | 60/311 |

Primary Examiner—Kathleen J. Prunner
Attorney, Agent, or Firm—Robert J. Outland

[57] ABSTRACT

A serviceable exhaust particulate trap for diesel engines comprising, in a preferred embodiment, a concentric dual bath filter including a tubular outer filter element of high surface area, such as pleated paper or the like, acting as a primary filter, and a tubular mesh-packed secondary filter in a central bypass passage. A normally closed pressure relief valve opens to permit bypass flow through the secondary filter in order to limit back pressure acting on the primary filter under various operating conditions. The particulate trap may be combined in a convenient package with a vehicle muffler.

4 Claims, 4 Drawing Figures

DIESEL ENGINE EXHAUST PARTICULATE TRAP

TECHNICAL FIELD

This invention relates to engine exhaust particulate traps and, more particularly, to serviceable dual-path exhaust particulate filters for vehicle-mounted combustion engines, such as diesel engines.

BACKGROUND OF THE INVENTION

Considerable efforts are currently being expended in search of practical ways to limit the amounts of particulate matter expelled to atmosphere in the operation of automotive diesel engines. Various approaches to the problem are being considered, including engine modifications and the installation of various types of exhaust particulate treatment devices—burners, filters, and the like.

SUMMARY OF THE INVENTION

The present invention provides a serviceable diesel engine exhaust particulate trap in the form of a dual-path exhaust particulate filter assembly having replaceable high surface area primary filter means. Protection against excessive pressure build-up is provided by a pressure responsive bypass valve opening to a bypass passage that incorporates a replaceable mesh or fibrous type secondary filter.

The filter elements are preferably arranged concentrically with a pleated paper or fiberglass primary element surrounding a tubular mesh-filled secondary element. Both elements are replaceable upon opening of a cover provided at one end of the assembly. Bypass flow to the secondary filter element provides for continuous filtration of exhaust gases, while protecting the primary filter against excessive pressures that might damage the element or adversely affect operation of the associated diesel engine. Excessive back pressures, high enough to open the bypass valve may occur during normal operation at high engine output, such as during vehicle acceleration or hill climbing, as well as when the volume of particulates collected by the primary filter is sufficiently great to impede normal gas flow therethrough. An indicating device could be associated with the bypass valve to indicate its opening to the vehicle operator and thus provide a means to monitor the condition of the exhaust filter and the need for servicing. The particulate trap assembly may be combined with an attached muffler to provide a compact package for vehicle installation.

These and other features and advantages of the invention will be more fully understood from the following description of a preferred embodiment, taken together with the accompanying drawings.

BEST MODE FOR CARRYING OUT THE INVENTION

Figure 1:
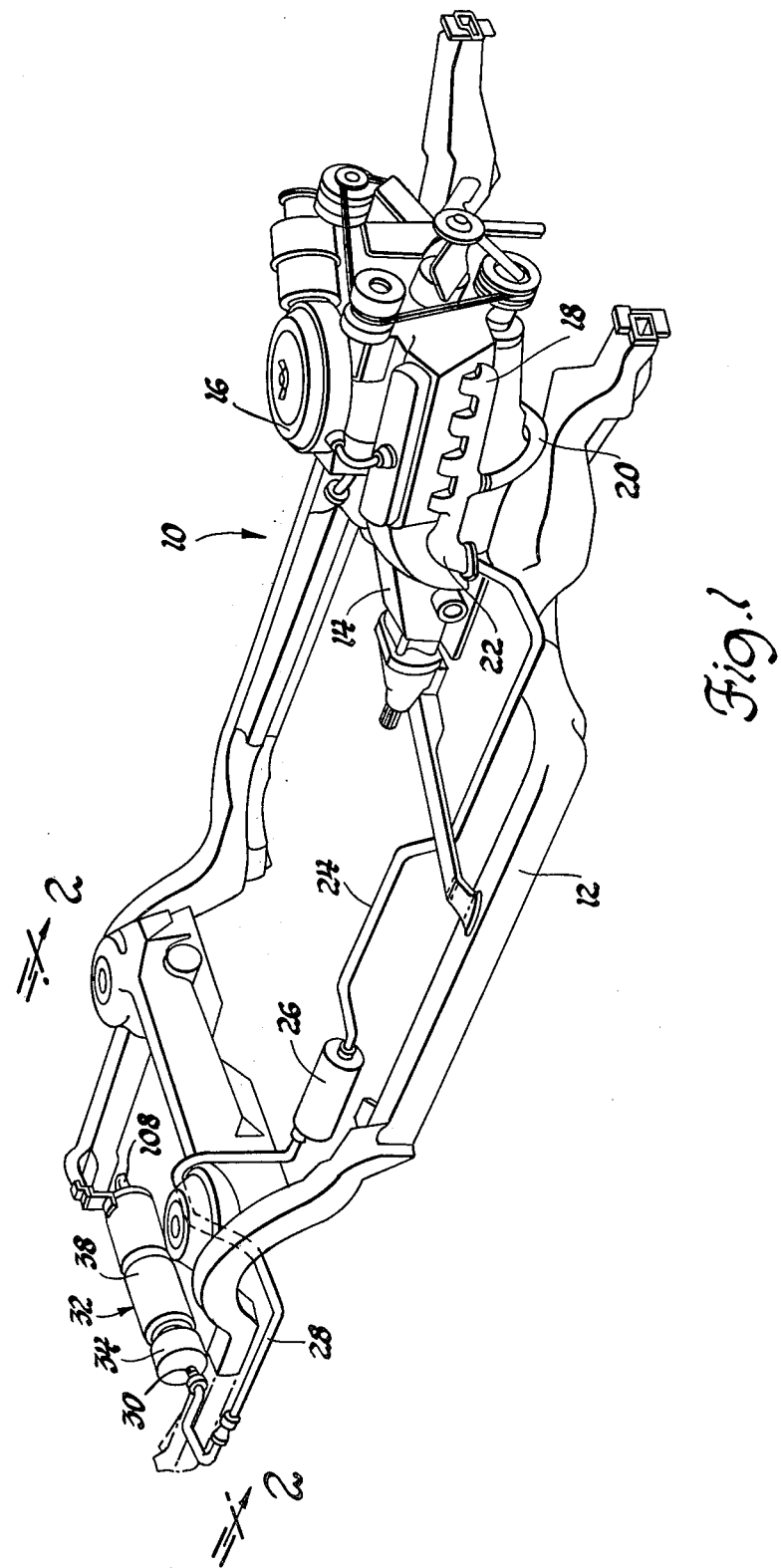
FIG. 1 is a pictorial view of a partial vehicle chassis showing the application of a diesel engine and exhaust system, including a particulate trap and muffler assembly in accordance with the present invention.

Referring first to FIG. 1 of the drawings, numeral 10 generally indicates a portion of a vehicle chassis including a vehicle frame 12 with an engine-transmission assembly 14 mounted near the front end thereof. The assembly 14 includes a diesel engine 16 having a pair of cylinder banks, each with its own exhaust manifold, only the right bank manifold 18 being shown. A crossover pipe 20 carries exhaust gases from the left bank exhaust manifold (not shown) to the right bank manifold 18. There, the exhaust gases from both manifolds are directed to an outlet connection 22 leading to an exhaust pipe 24 that connects with a resonator 26 mounted midway of the vehicle frame. A tailpipe 28 connects the resonator with the inlet 30 of a particulate trap and muffler assembly 32 mounted transversely in the rear of the vehicle frame.

Figure 2:
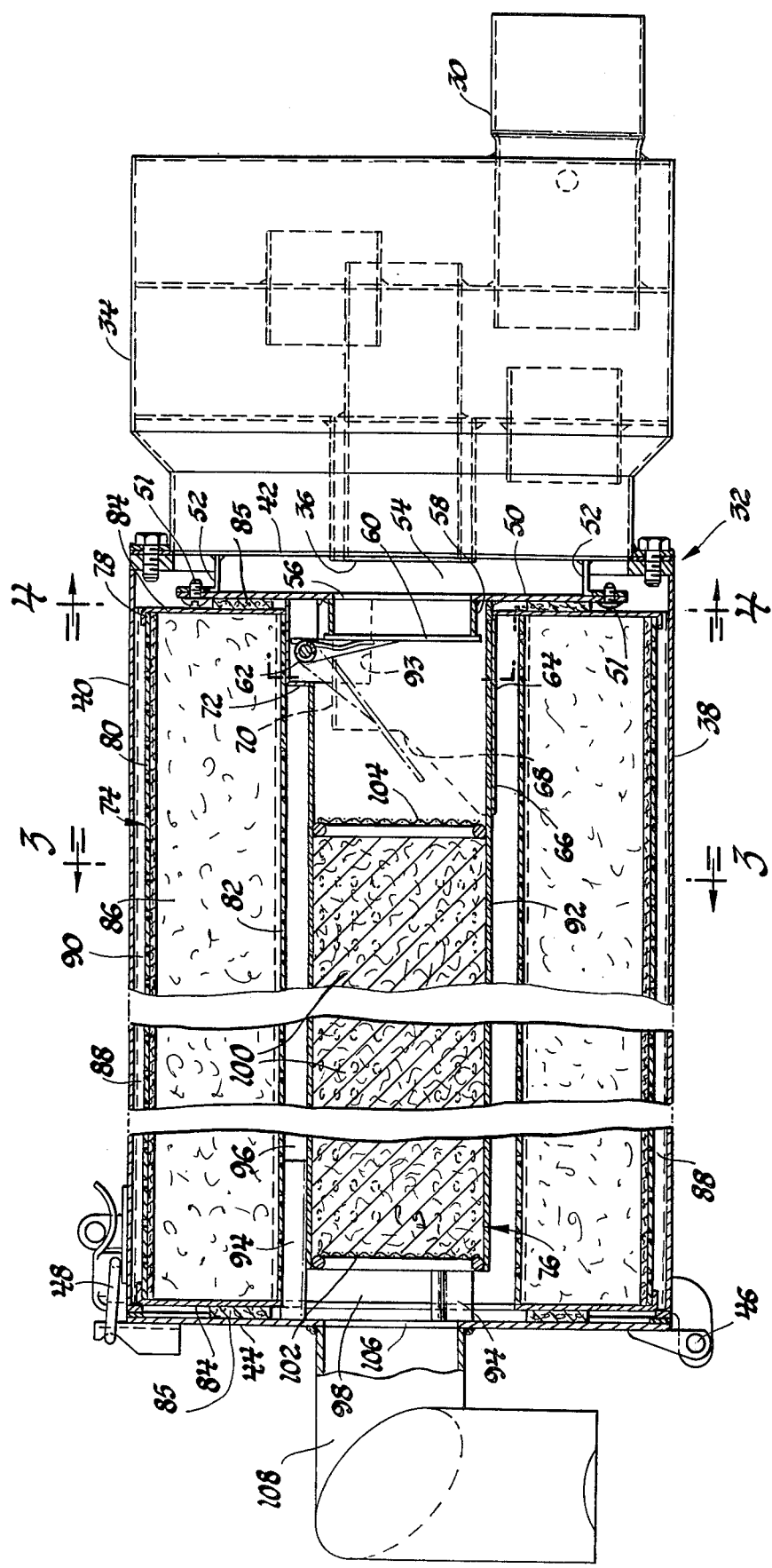
FIG. 2 is a rear view of the trap and muffler assembly of FIG. 1 with the filter portion of the assembly seen in cross section from the plane indicated by the line 2—2 of FIG. 1.
Figure 3:
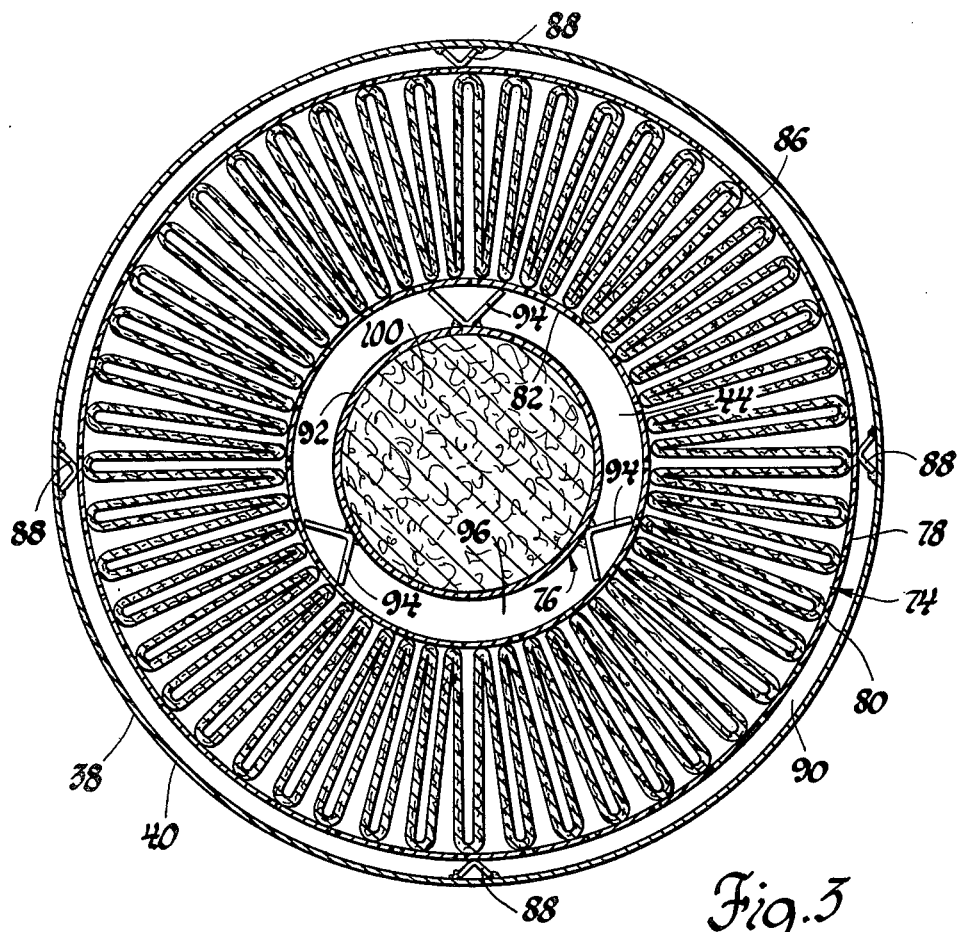
FIG. 3 is a transverse cross-sectional view through the filter assembly, as viewed in the direction of the arrows from the plane indicated by the line 3—3 of FIG. 2.
Figure 4:
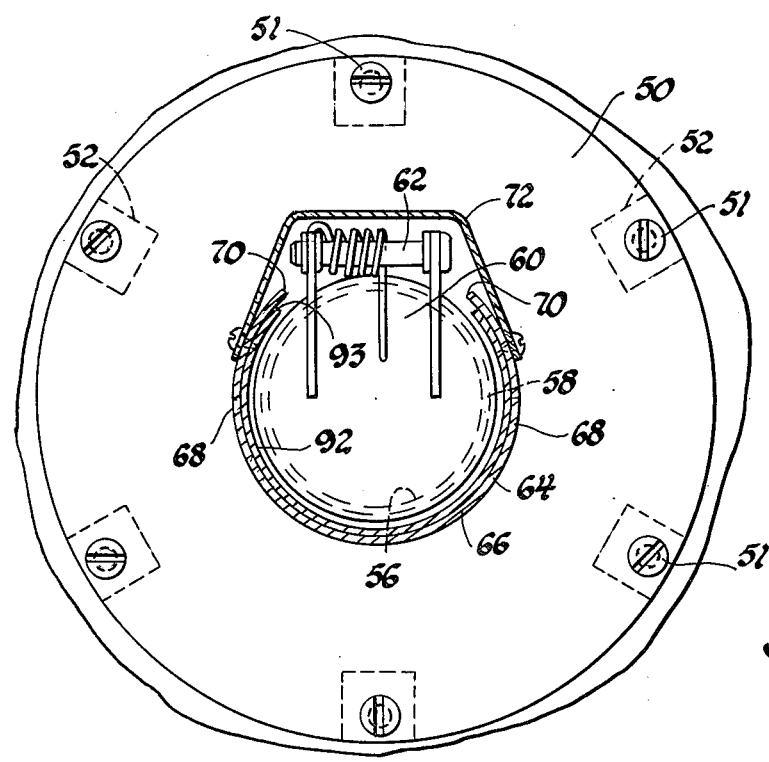
FIG. 4 is a transverse cross-sectional view of the inlet portion of the filter assembly, as viewed from the plane indicated by the line 4—4 of FIG. 2.

As shown in detail in FIGS. 2 through 4, the particulate trap and muffler assembly 32 includes a short cylindrical muffler 34 having baffled interior chamber arranged to reduce the transmission of sound in exhaust gases passing from the inlet 30 to a central outlet 36 leading to an adjacent trap assembly 38 to which the muffler 34 is secured.

The trap assembly 38 includes a cylindrical outer shell 40 which supports at one end, a removable inlet end wall 42 that also forms an end wall of the adjacent muffler 34 through which muffler outlet 36 extends. At the other end of the trap assembly 38, an openable outlet end wall 44 is pivotally mounted to the shell by a hinge member 46 and normally retained in closed position by a spring clasp 48.

The outer shell 40 and the inlet and outlet end walls 42, 44 define an enclosed space, near the inlet end of which is a circular dividing wall 50, secured by screws 51 to a plurality of brackets 52 welded to the inlet end wall 42. The walls 50 and 42 together define a gas inlet portion 54 that extends radially outward from the muffler outlet 36 to the outer shell 40.

In the center of the dividing wall 50, a bypass passage 56 extends through the wall and a short tube 58. Passage 56 is normally closed by a spring-biased valve 60 supported on a hinge 62 and engaging wall 58, but openable by gas pressure to permit flow through the bypass passage 56. Around the tube 58 and the valve 60 there is mounted on wall 50 an extending part-cylindrical filter support 64 having an extending lower lip 66, connected with cut-back, upwardly extending sides 68 and open at the top 70 to provide clearance for the valve hinge 62. A cover member 72, attached to the filter support 64 closes the area around the valve 60 against leakage of gas from the bypass passage 56.

Within the shell 40 and between the outlet end wall 44 and the dividing wall 50, there are removably carried a primary filter element 74 and a secondary filter element 76. Primary element 74 preferably includes a metal container 78 having perforated, coaxially disposed, outer and inner tubular walls 80, 82 and end members 84 enclosing an annular filter 86 preferably formed of pleated paper or fiberglass to provide a large surface area for filtration. Gaskets 85 are provided to seal the ends of the primary filter element 74 which is supported in spaced relationship with the trap outer shell 40 by four equally spaced angle supports 88 that are welded to the outer shell. These supports maintain an annular space 90 between the outer shell 40 and the primary element 74 permitting the passage of incoming exhaust gases around the periphery of the primary element 74.

The secondary filter element 76 includes a tubular passage member 92 which is received in and supported at one end by the part-cylindrical support 64 at the inlet end of the trap assembly. At this end, a portion 93 of the member 92 is cut away to provide clearance for the hinge 62 of the bypass valve. At its other end, the passage member 92 is supported by three angle supports 94 that are welded to the member 92 and hold it in concentric spaced relationship with the inner wall 82 of the primary filter element. The outlet end of the member 92 is spaced away from the hinged outlet end wall 44 by the extension of the angle supports 94 beyond the end of member 92 to a point adjacent the end wall 44. The spaced relationship of the primary and secondary filter elements provide an annular outlet space 96 between the passage member 92 and the inner wall 82 of the primary filter element into which gases passing through the primary filter element are directed. The annular outlet space 96 connects with an outlet portion 98 located at the end of passage member 92 inside the end wall 44.

Within the passage member 92, which forms its outer shell, the secondary filter element includes a compressed body of metallic fiber 100 retained by spaced screen members 102 and 104, the latter being spaced from the inlet end of the passage member 92 to leave clearance for opening of bypass valve 60 into the passage member 92. The outlet portion 98 connects, through an opening 106 in the outlet end wall 44, with an exhaust duct 108 for carrying the filtered exhaust gases to atmosphere.

In operation, exhaust gases delivered from the engine to the trap and muffler assembly 32 are passed through the muffler 34 and delivered therefrom into the gas inlet portion 54. During normal low pressure conditions, when the bypass valve 60 is closed, the exhaust gases move outwardly into the annular space 90 around the primary filter element 74 from which they pass radially inwardly through that element, leaving substantial portions of the exhaust particulates in the gases deposited on the extended surfaces of the pleated filter 86 within the primary filter element 74. The filtered gases pass from the primary filter element into the annular outlet space 96 surrounding the passage member 92 and are directed thereby toward the outlet end of the assembly into the outlet portion 98, and out through the opening 106 and the exhaust duct 108.

Whenever the back pressure of exhaust gases within the trap assembly become sufficiently high, as may occur when the filter 86 becomes clogged with particulates or when the engine is operated at a high power output, it forces the bypass valve 60 to open and allow some of the exhaust gas to pass from the inlet portion 54 into the bypass passage member 92 and through the secondary filter element 76 to the trap outlet portion 98. The metallic fiber material 100 of the secondary filter element provides a more open, and thus less restrictive, passage for gas flow than the fine pores of the pleated filter 86 in the primary filter element. However, the tortuous flow path through the metallic fiber material 100 of the secondary filter element also provides efficient filtering of particulates from the exhaust gases passing therethrough. Moreover, since the secondary element 76 is called upon to provide filtration of exhaust gases only during specified conditions of relatively limited duration, the volume of particulates collected is not likely to cause substantial clogging of the secondary element, at least until such time as the primary filter element becomes filled and the trap assembly requires servicing.

The particular construction of the trap assembly, as well as the location of the trap and muffler assembly within the vehicle chassis, have advantages which may not be immediately apparent. The installation of the trap and muffler assembly at the rear of the vehicle frame provides an extended length of exhaust conduit between it and the engine. The passage of the exhaust gases through this extended length of conduit has a cooling effect which reduces the gas temperature to a point where it may be possible to use a low-temperature filter material, such as the previously mentioned pleated paper filter material. Additional cooling of the exhaust gases is obtained by passing them outwardly along the outer shell 40 of the trap assembly before they are passed through the pleated primary filter.

If desired, cooling fins could be applied to various portions of the exhaust pipes and to the outer shell of the trap assembly in order to increase the desired cooling effect.

When servicing of the particulate trap assembly is required, this is easily accomplished by loosening the spring-clasp 48 and swinging the outlet end wall 44 downwardly around its hinge member 46, thereby exposing the outer ends of the filter elements. At this point, either the primary filter element alone, or both the primary and secondary filter elements, may be removed and replaced or cleaned in any suitable manner. The trap assembly may then be quickly provided with new or serviced filter elements and new gaskets. The outlet end wall is then latched in its closed position and the unit is again ready for service.

While the invention has been described by reference to a single preferred embodiment, it should be understood that numerous changes could be made in the various details of construction disclosed without departing from the spirit and scope of the inventive concepts embodied therein. It is accordingly intended that the invention not be limited by the disclosed embodiment, but that it have the full scope permitted by the language of the following claims.

The embodiments of the invention in which an exclusive property or privilege is claimed are defined as follows:

1. A dual path exhaust particulate filter for combustion engines, said filter comprising
   a housing having an inlet and an outlet and defining an enclosed space therebetween, said space being separated into first and second gas flow paths extending between the inlet and outlet,
   a primary high efficiency filter element disposed in said first flow path to collect a large portion of particulates from exhaust gases passed therethrough,
   a secondary low restriction filter element disposed in said second flow path to collect a substantial volume of particulates from exhaust gases passed therethrough, and
   pressure actuated valve means normally operative to close said second flow path and direct exhaust gas flow through said first flow path for cleansing by said primary filter element, said valve means being responsive to predetermined conditions of high pressure to open and permit excess gas flow to pass through said second flow path for cleansing by said secondary filter element.

2. A diesel engine exhaust particulate filter comprising, an elongated housing having an inlet and an outlet at opposite ends, one of said ends having an openable cover permitting access to the housing interior through an access opening, means defining first and second parallel gas flow paths extending through the housing between the inlet and outlet, said first flow path extending along the walls of the housing and containing a tubular primary filter elemnt removable through said access opening and arranged for gas flow from the periphery to the interior of the element whereby exhaust gas passing through the element is first passed in heat exchange relation with the housing walls to cool the gas before filtering thereof, said second flow path extending through the center of the tubular element and containing a secondary filter element removable through said access opening and arranged to filter gas passing through the central second flow path, and pressure responsive valve means normally preventing flow through the second flow path and responsive to predetermined conditions of high pressure in the gas inlet to open and permit excess gas flow to pass through the second flow path to be filtered by the secondary filter element.

3. The combination of claim 2 wherein said primary filter element comprises a pleated filter having a large filtering area and limited capability to withstand differential pressure and said bypass valve is set to open at a pressure differential low enough to protect the primary element against failure from overpressure.

4. A filter in accordance with claim 3 wherein the material of said pleated filter is paper.

* * * * *

UNITED STATES PATENT AND TRADEMARK OFFICE
CERTIFICATE OF CORRECTION

PATENT NO. : 4,264,344

DATED : April 28, 1981

INVENTOR(S) : Otto A. Ludecke, Theodore L. Rosebrock

It is certified that error appears in the above—identified patent and that said Letters Patent is hereby corrected as shown below:

Title page, [57] Abstract, line 3, "bath" should read -- path --.

Claim 2, Col. 5, line 19, "elemnt" should read -- element --.

Signed and Sealed this

Thirteenth Day of October 1981

[SEAL]

Attest:

GERALD J. MOSSINGHOFF

Attesting Officer     Commissioner of Patents and Trademarks